Oct. 26, 1937.  O. A. HOKANSON  2,096,718
AUTOMATIC PHONOGRAPH
Filed Aug. 18, 1936  8 Sheets-Sheet 1

Inventor,
Otto A. Hokanson,
by Walter P. Geyer
Attorney.

Oct. 26, 1937.    O. A. HOKANSON    2,096,718
AUTOMATIC PHONOGRAPH
Filed Aug. 18, 1936    8 Sheets-Sheet 2

Fig. 3.

Fig. 4.

Inventor
Otto A. Hokanson
by Walter P. Guyer
Attorney

Oct. 26, 1937.　　　O. A. HOKANSON　　　2,096,718
AUTOMATIC PHONOGRAPH
Filed Aug. 18, 1936　　　8 Sheets-Sheet 3

Inventor
Otto A. Hokanson,
by Walter P. Geyer
Attorney.

Oct. 26, 1937.  O. A. HOKANSON  2,096,718
AUTOMATIC PHONOGRAPH
Filed Aug. 18, 1936   8 Sheets-Sheet 5
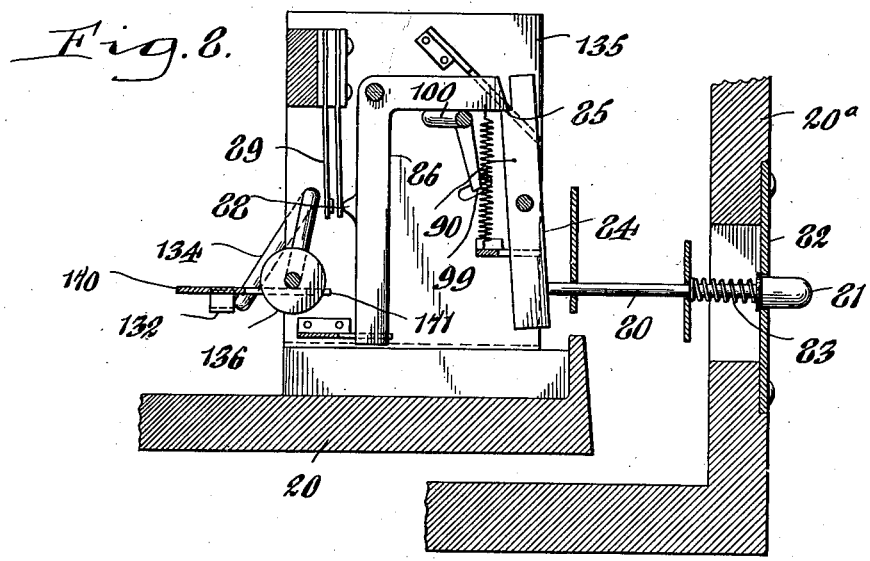
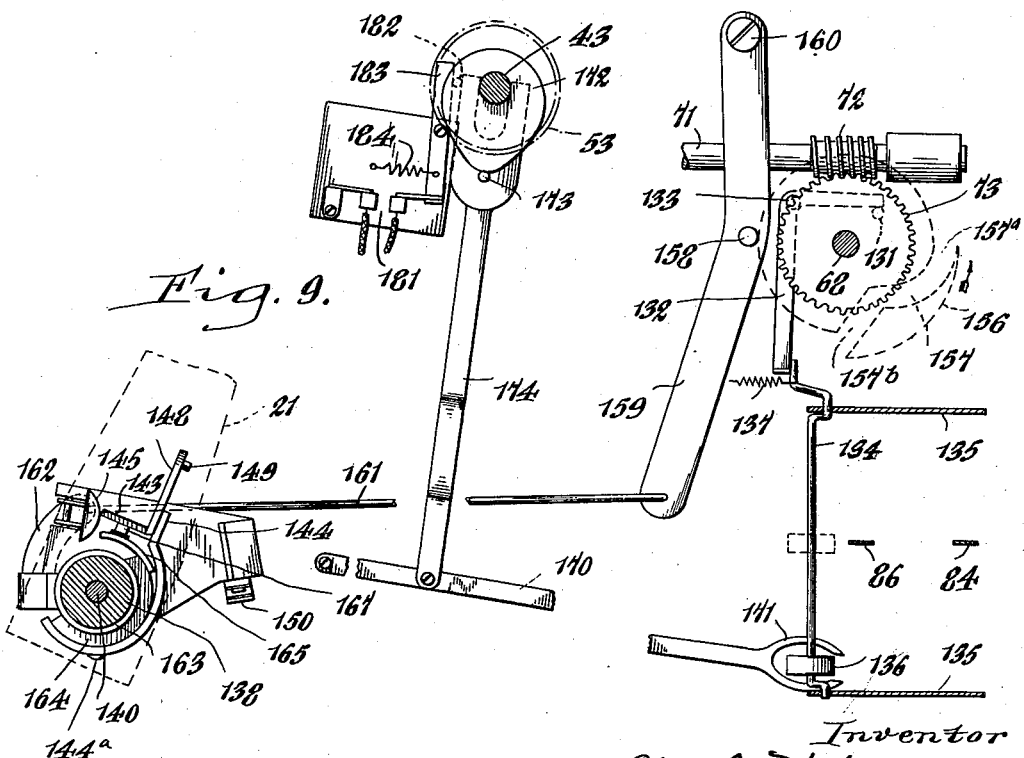
Inventor
Otto A. Hokanson,
by Walter P. Guyer
Attorney

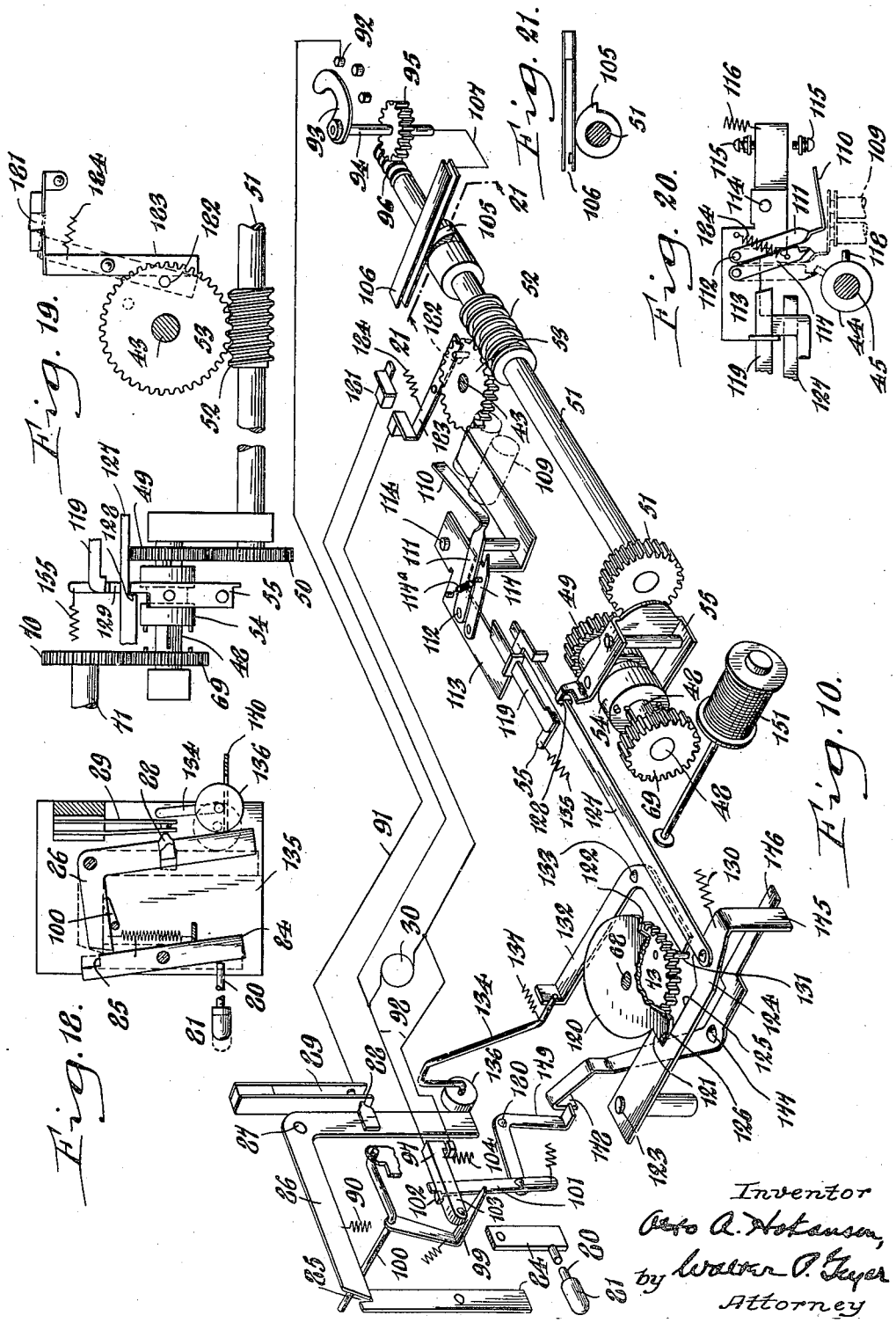

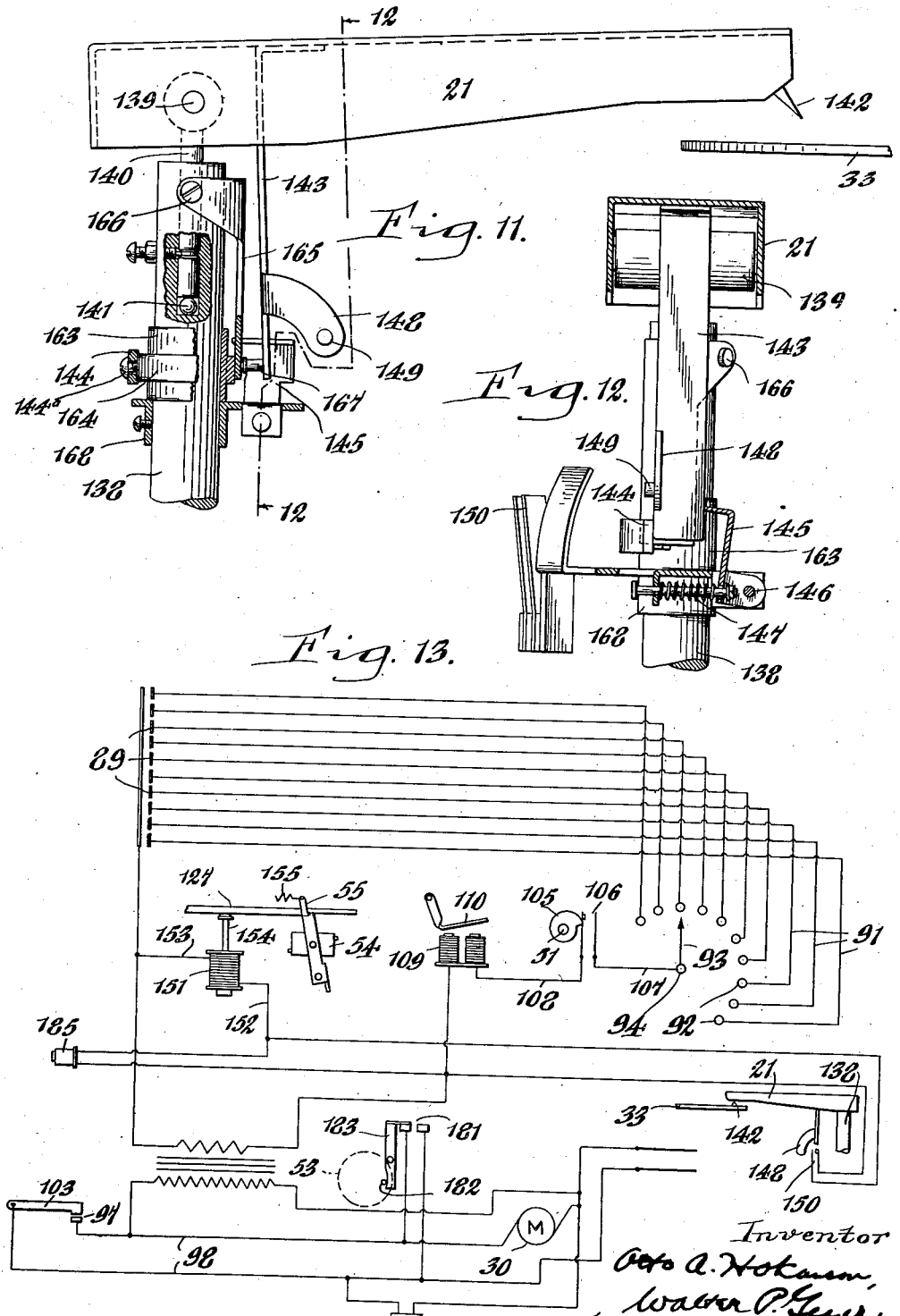

Oct. 26, 1937. O. A. HOKANSON 2,096,718
AUTOMATIC PHONOGRAPH
Filed Aug. 18, 1936 8 Sheets-Sheet 8

Inventor
Otto A. Hokanson,
by Walter P. Geyer
Attorney

Patented Oct. 26, 1937

2,096,718

UNITED STATES PATENT OFFICE 2,096,718

AUTOMATIC PHONOGRAPH

Otto A. Hokanson, North Tonawanda, N. Y., assignor, by mesne assignments, to The Rudolph Wurlitzer Company, Cincinnati, Ohio, a corporation of Ohio Application August 18, 1936, Serial No. 96,642

20 Claims. (Cl. 274—10)

This invention relates to certain new and useful improvements in automatic phonographs.

One of its objects is the provision of an automatic selective phonograph wherein the records are supported axially on the turntable in the form of a stack, and wherein means are provided for elevating the turntable to an elevation in accordance with the record selected and for dividing or separating the stack at the record selected to provide a space for the movement of the tone arm for the playing of the record.

A further object is to provide simple, reliable and efficient means for automatically controlling the selection and playing of the records, in conjunction with means for simultaneously selecting a plurality of records at one time, whereby the records selected will be automatically played without attention on the part of the operator.

A still further object of the invention is the provision of an automatic multi-selective phonograph whose various mechanisms are compactly arranged to occupy a minimum of space, and wherein the parts are so designed and constructed as to be reliable in operation.

Other features of the invention reside in the construction and arrangement of parts hereinafter described and particularly pointed out in the appended claims.

In the accompanying drawings:—

Figure 1:
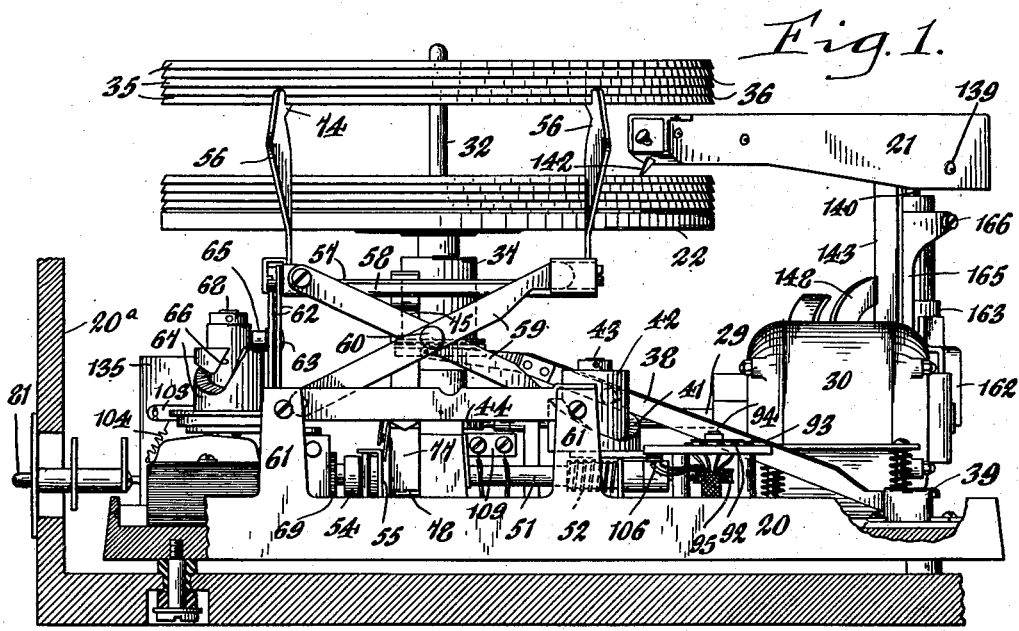
Figure 2:
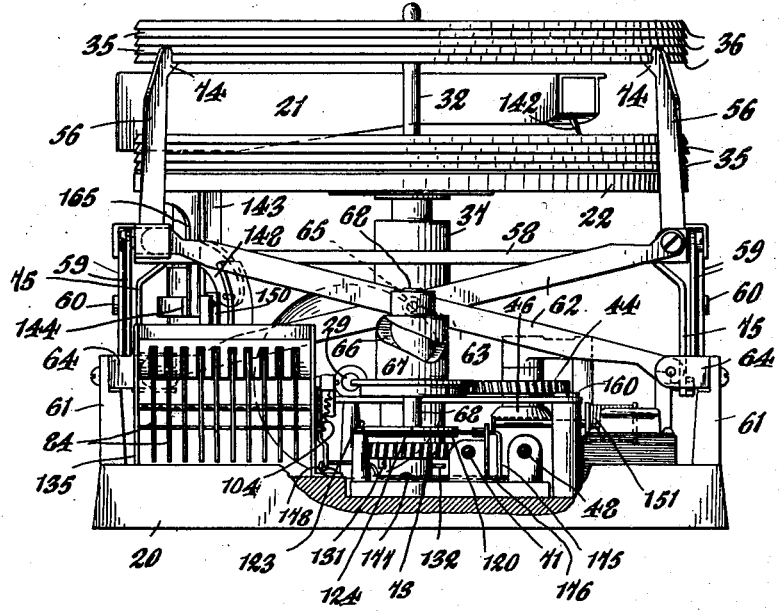
Figure 5:
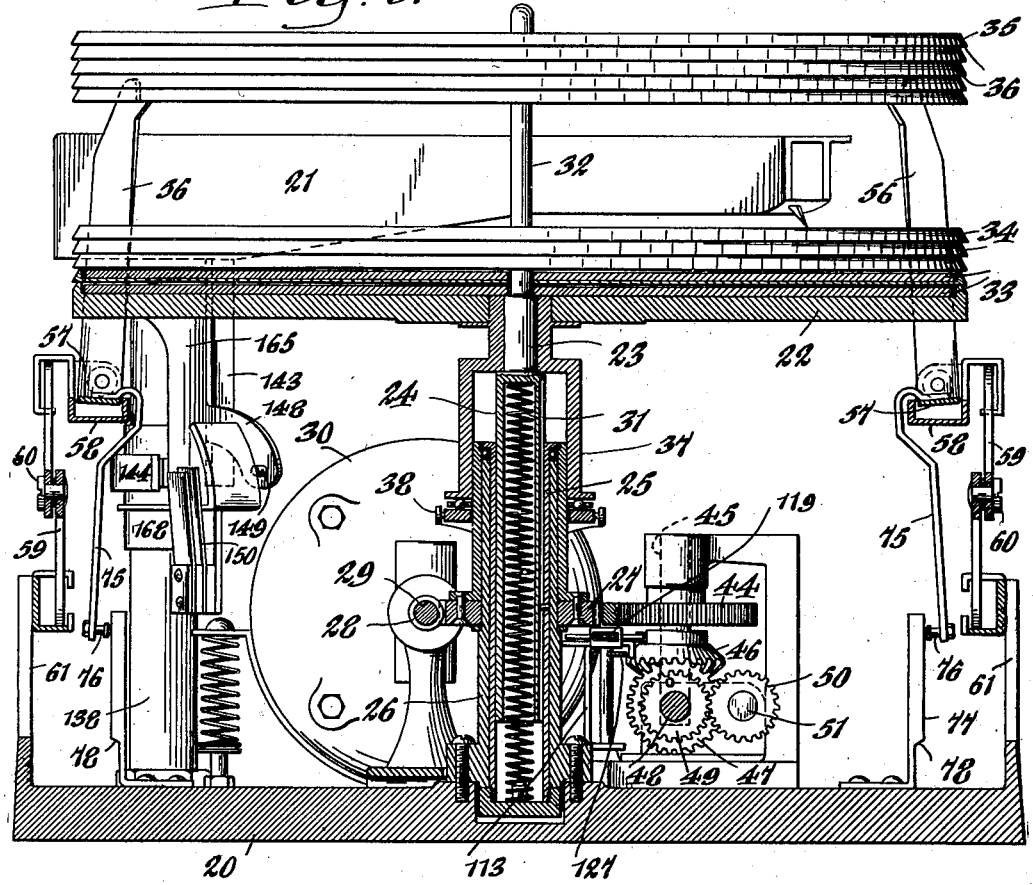
Figure 6:
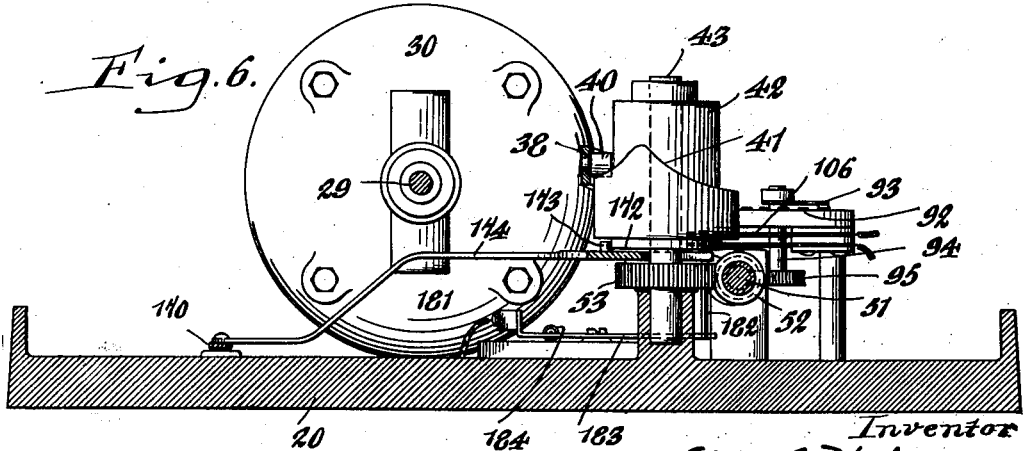
Figure 4:
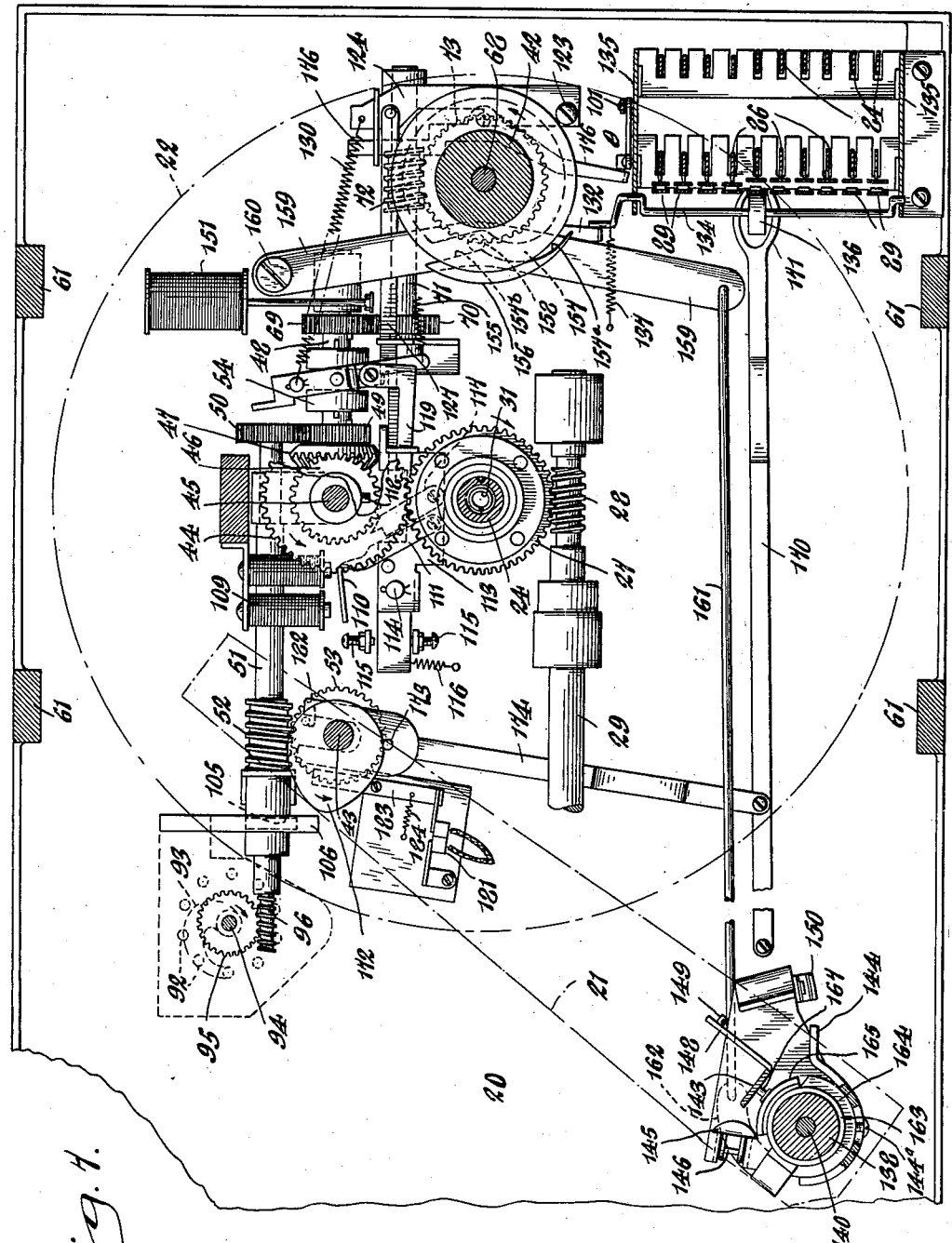
Figure 14:
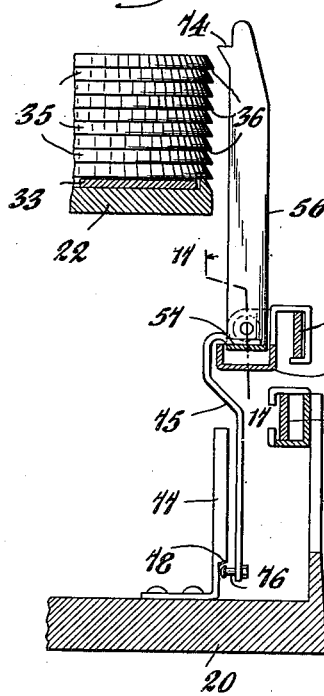
Figure 15:
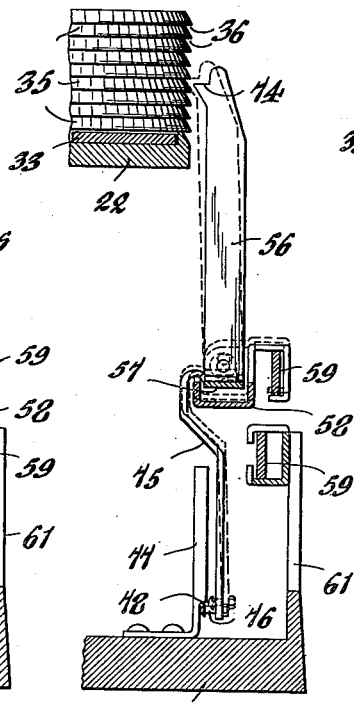
Figure 16:
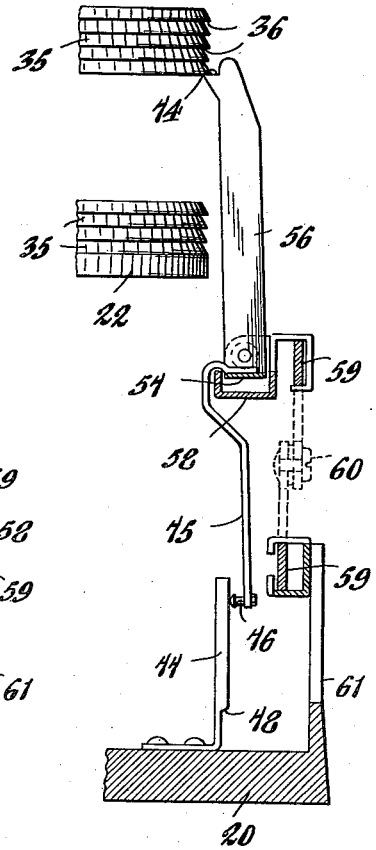
Figure 14:
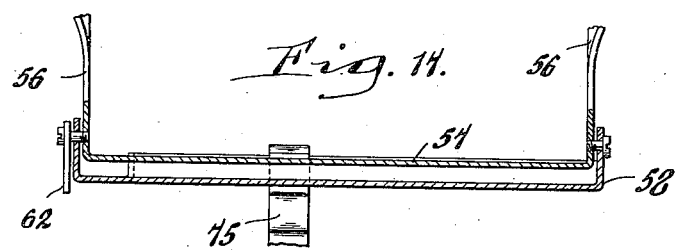

Figure 1 is a side elevation, partly in section, of the automatic multi-selective phonograph embodying my invention. Figure 2 is a front elevation of the same, partly in section. Figure 3 is a side elevation thereof taken from the side opposite to that viewed in Figure 1. Figure 4 is a top plan view of the same, the turntable being shown in dotted lines. Figure 5 is an enlarged transverse section taken substantially in the plane of line 5—5, Figure 4. Figure 6 is an enlarged transverse section taken on line 6—6, Figure 4. Figure 7 is a horizontal section taken substantially in the plane of line 7—7, Figure 3. Figure 8 is an enlarged fragmentary vertical section taken in the plane of line 8—8, Figure 4. Figure 9 is an enlarged fragmentary top plan view, partly in section, of the selector control mechanism, showing the position of the parts when the phonograph is in non-playing position. Figure 10 is a diagrammatic perspective view of the control mechanism of the phonograph. Figure 11 is a side elevation, partly in section, of the tone arm and its associated parts. Figure 12 is a vertical transverse section taken on line 12—12, Figure 11. Figure 13 is a diagrammatic view of the electric circuit including the various control elements. Figures 14, 15 and 16 are fragmentary sectional views showing the various positions of the turntable and stack splitting means during selection of a record for play. Figure 17 is a cross section taken on line 17—17, Figure 14. Figure 18 is a detail side view of one of the selector controlled switches in its closed position. Figure 19 is a fragmentary top plan view of the clutch assembly. Figure 20 is a fragmentary top plan view of the selector-controlled clutch governing mechanism. Figure 21 is a cross section taken on line 21—21, Figure 10.

Similar characters of reference indicate corresponding parts throughout the several views.

In its general organization, this automatic selector phonograph comprises a vertically reciprocating turntable which constitutes a support for a plurality of records disposed in stack-like fashion axially of the turntable; a selector-elevating mechanism movable at a predetermined time into supporting engagement with those records in the stack immediately above the one pre-selected for play, for elevating such supported records to split the stack and provide an operating space for the movement of the tone arm during the playing of the selected records; a tone arm mounted to swing in a definite horizontal plane and pivoted to swing vertically into engagement with the record or to a position to clear it when the tone arm is returned to its initial position after playing the record; an elevating mechanism for the turntable which functions to elevate the turntable to varied elevations corresponding to those of the records selected, and operating at a time prior to that of the selector-elevating mechanism to bring the selected record at its proper playing elevation, after which such selector-elevating mechanism splits the record stack and moves it a definite and constant height, as compared with the elevating mechanism of the turntable which moves the turntable a variable height to effect and govern the selection; and a plurality of selector members or push buttons for simultaneously selecting at the will of the user a plurality of records to be played and included in a selective control circuit which governs the automatic playing of the records selected.

Referring now to the drawings, showing more particularly the chassis of a phonograph, 20 indicates a supporting platform or frame upon which the working parts of the phonograph are mounted, and which platform, in practice, is mounted in a cabinet of appropriate design, the numeral 20a indicating a portion of the cabinet.

The tone arm, indicated generally at 21, may be of usual construction and is mounted to assume a definite horizontal plane of movement. The turntable 22 is mounted on an upright spindle 23 whose lower portion 24 is keyed or feathered to a revolving sleeve 25 applied to an upright bearing member 26 secured to the platform 20 and having a driven gear 27 thereon meshing with a drive pinion 28 secured to the shaft 29 of an electric motor 30. The lower portion 24 of the spindle may be hollow, as shown, to receive a spring 31 serving to cushion the movement of the turntable to its lowered position. The upper portion 32 of the spindle constitutes a guide post for the records 33, the latter being supported in suitable trays on carriers 34. As shown in Figures 1, 3 and 5, the records are disposed in superposed relation in the form of a stack, being normally directly supported on the turntable, and being capable of sliding on the spindle-extension 32 during the selection of the desired record to be played. It will be also observed in these figures that the peripheral edges of the record trays 34 slope upwardly and inwardly, as indicated at 35, whereby resulting shoulders 36 are provided at the bottom peripheral edges of the trays, the whole stack giving the appearance, at the periphery profile, of a series of ratchet teeth, all for a purpose to be hereinafter described. Depending from the turntable about its spindle 23 is a collar 37 with which the elevating mechanism for the turntable is adapted to engage.

The means for elevating the turntable to variable heights in accordance with the selected record to be played and for lowering it after play consists of an actuating arm 38 whose outer end is supported for relative sliding and pivotal movements in a bracket 39, and whose outer bifurcated end embraces the revolving spindle-sleeve 25 and bears against the underside of the turntable-collar 37, so that when this arm is vertically actuated it causes the vertical reciprocation of the turntable. Intermediate its ends the arm 38 has a roller 40 which engages a cylindrical elevating cam 41 applied to a sleeve 42 fixed on an upright shaft 43 which is driven at predetermined times in the cycle of operations of the machine from the motor shaft 29 to elevate the turntable to different record-playing elevations. Motion is transmitted to the cam shaft 43 from the motor shaft 29 through the medium of a gear 44 mounted on an upright stub shaft 45 having a bevel gear 46 thereon which meshes with a like gear 47 mounted on a horizontal shaft 48 journaled in suitable bearings applied to the platform 20. Loosely mounted on this shaft is a clutch-controlled gear 49 meshing with a similar gear 50 fixed on one end of a counter shaft 51 likewise journaled in suitable bearings applied to the platform and provided at its opposite end with a worm 52 meshing with a worm wheel 53 fixed to the cam shaft 43. A sliding clutch collar 54 keyed to the shaft 48, and actuated by a clutch lever 55, serves at predetermined times to clutch the gear 49 to said shaft and accordingly transmit motion to the cam shaft 43.

Mechanism, hereinafter described, is provided for automatically shifting the clutch lever to its applied and released positions to transmit motion to the turntable elevating cam and arrest it at the predetermined elevation corresponding to that at which the selected record is played.

After the selected record in the stack is moved by the turntable to its predetermined playing elevation, and which elevation is variable for each record because of the fact that the tone arm of the phonograph remains at a fixed elevation, it is then necessary to split the record-stack and to elevate those records, above the selected record, as a unit to provide an operating clearance for the movement of the tone arm during the playing of the selected record. By preference, this elevating of the records to split or divide the stack vertically is accomplished as follows:—

Disposed at diametrically opposite sides of the turntable for releasable interlocking engagement with the records to support and elevate them above the plane of movement of the tone arm are pairs of upright supporting arms 56 which at predetermined times are adapted to be automatically brought into supporting engagement with those records above the selected one to elevate them and again to be automatically lowered and subsequently released therefrom after the playing of a selected record and before the selection of another record. Each pair of supporting arms constitutes part of an upright U-shaped rock bar 57 pivoted to rock about a horizontal axis in a supporting frame 58 which is U-shaped in plan, as seen in Figure 4, with the rock bars disposed in the leg portions thereof. Connected to the leg portions of this supporting frame to raise and lower the same, are elevating units which may be in the form of crossed levers 59 pivoted intermediate their ends to one another at 60 and slidingly and pivotally joined at their free ends to the frame 58 and to brackets 61 rising from the platform 20, as shown in Figures 1 and 3. Also connected to the ends of the web portion of the U-frame 58 are similar crossed levers 62 which are pivoted intermediate their ends at 63 and are slidingly and pivotally joined at their free ends to the U-frame and to extensions 64 formed on one set of the brackets 61, as shown in Figure 2. By this construction, as the sets of levers 59 and 62 are expanded and contracted, the record-engaging arms 56 are simultaneously raised and lowered, as a unit, the levers acting after the fashion of lazy tongs. Applied to the pivot 63 of the cross levers 62 is a roller 65 which engages a substantially spiral-shaped cam groove 66 formed in a revolving sleeve or cylindrical cam 67 mounted on an upright shaft 68 for moving the record-engaging arms to and from a constant elevation. Motion is transmitted to the cam shaft 68 from the motor shaft 29 through the medium of the shaft 48 on which the clutch collar 54 is mounted. This collar, when shifted to the right, viewing Figure 7, engages a gear 69 loosely mounted on the shaft 48 and meshing with a like gear 70 fixed on a countershaft 71. Also mounted on the latter is a worm 72 meshing with a worm wheel 73 fixed on the lower end of the cam shaft 68. Thus, when the clutch collar 54 is coupled with the gear 69, motion is transmitted to the cam shaft to cause the crossed levers to expand and contract and accordingly raise and lower the record-supporting arms 56.

In the lowered retracted position of the supporting arms 56, shown in Figure 14, the toothed record-engaging portions 74 thereof assume a definite predetermined elevation relative to the horizontal plane of movement of the tone arm, the top record of the stack being below that elevation, so that when the turntable is elevated to a predetermined height to play a selected record, as shown in Figure 15, the upwardly-facing shoulders of the arm-teeth 74 will be so disposed as to be in a plane substantially at or somewhat below the top surface of the record to be played, whereby, when the arms 56 are rocked inwardly, as seen by dotted lines in Figure 15, they will engage the peripheral edge-shoulder 36 of the record tray immediately above the selected record and upon expansion of the cross levers 59 and 62 the records supported by these arms will accordingly be elevated, as shown in Figure 16, to provide an operating clearance space for the tone arm. The means for rocking the bars 57 carrying the record-engaging arms 56 inwardly, after the selected record has been brought by the turntable to an elevation corresponding to its playing position, consist of actuating fingers or extensions 75 anchored at their upper ends to the rock bars and provided at their lower ends with follower-pins 76 which are adapted to engage upright cam bars 77. In the lowered position of the U-frame 58, shown in Figures 14 and 15, these follower pins contact the companion cams immediately below their shoulders 78, at which time the record-engaging arms 56 are in their retracted position and free from engagement with the peripheral edges of the record trays. Immediately upon the upward movement of this U-frame because of the expansion of the levers 59 and 62, the actuating fingers 75 are swung outwardly to the position shown by dotted lines in Figure 15 and the record-engaging arms are swung inwardly into gripping engagement with the peripheral lower edge of the adjoining record-tray, or that record immediately above the one positioned for play.

The means for governing the selection of the records and the selector mechanisms for controlling the raising and lowering of the turntable as well as the raising and lowering of those records in the stack above the selected one for play, are preferably constructed as follows:

Mounted conveniently on the phonograph cabinet are a plurality of selector rods 80 having buttons or heads 81 at their front ends which correspond to the number of records in the stack and which extend through a face plate or panel 82, the faces of the buttons being suitably marked by number or otherwise to correspond with the records. Springs 83 applied to the selector rods serve constantly to maintain them in the normal retracted position, shown in Figure 8. These selector rods are disposed in a row and each abuts at its inner end against the lower arm of a companion upright lever 84, the upper arm of such lever having a notch 85 therein with which the adjoining arm of a companion vertically-swinging bell crank lever 86, pivoted at 87, is adapted to normally interlatch. The other arm of this bell crank lever carries an abutment 88 which is adapted to close an electric switch 89 when the lever 84 is released from interlocking engagement with the bell crank by depressing a selector rod 80, a spring 90 applied to this bell crank tending to swing such lever in a direction to close said switch. Each switch 89 is included in an electric circuit for governing the shifting of the clutch 54, 55, at a predetermined time, from its operative position, in engagement with the gear 49 to rotate the counter-shaft 51 and elevate the turntable 22, to its other operative position in engagement with the gear 69 to elevate the stack above the record selected for play. Leading from each switch 89, one of which is associated with each selector rod 80, is a wire 91 which is connected to the companion post or terminal 92 of an annular row of terminals corresponding in number to the selector push rods 80 and with which a revolvable contact arm 93 is adapted to engage. This contact arm is fixed on a shaft 94 having a gear 95 thereon meshing with a worm 96 applied to the outer end of the counter shaft 51, as shown in Figures 7 and 10, said arm being rotated simultaneously with the drive mechanism controlling the vertical movements of the turntable. It should be noted here, that when a selector rod is pushed inwardly to close the circuit including its companion switch 89, that simultaneously with such movement, a master switch 97, included in the circuit 98 of the drive motor 30, is automatically closed to start the motor, should it not be closed at the time of the selection. This closing of the motor switch is accomplished by a tappet arm 99 applied to a vertically-swinging bail 100 which is disposed beneath and in the path of movement of the horizontal arms of the several bell crank levers 86 associated with the selector rods 80. This tappet is adapted to release a latch bar 101 from a shoulder 102 on the movable member 103 of the motor switch, a spring 104 applied to the latter tending constantly to swing the movable member in a direction to close the switch. Thus, should the motor switch be opened at the time a selection is made by depressing a given selector rod, the bell crank 86 companion to that rod will be swung in a direction to accordingly rock the bail 100 downwardly and move its tappet 99 in a direction to release the latch 101 from the movable switch member 103 and allow the spring 104 to close the motor switch and start the motor. From the foregoing it will be seen that the depression of a selector rod will not only start the drive motor 30 to rotate the turntable and elevate it, but will also, by closing the switch 89, establish the circuit including the revolving switch-arm 93 and the contacts 92 and thereby control the elevation of the turntable to a height corresponding to that assumed by the record selected at the selecting panel 82.

Rotatable with the counter-shaft 51 is a cam 105 which controls the making and breaking of a switch 106 included in the circuit of the arm 93 and one terminal of which is connected by a wire 107 with the shaft 94 to which said arm is fastened. The relative speed of the contact-arm shaft 94 is such that for each revolution of the counter shaft 51 the contact arm 93 travels a distance equal to that between two adjoining terminals 92. The other terminal of this switch is connected by a wire 108 with an electromagnet 109 whose armature 110 is joined to a horizontally-swinging arm 111 pivoted at 112 to a fulcrum-plate 113 pivoted to an upright pivot pin 114 and free to swing in a limited path between adjustable stops 115. A spring 116 constantly urges this fulcrum-plate against one of the stops, as seen in Figure 7. Disposed alongside the arm 111 and in edgewise contact therewith to be moved thereby, is a trip arm 117, which, when the electromagnet 109 is energized, is swung to a position in the path of a tappet pin 118 applied to the hub of the bevel gear 44 of the upright shaft 45. When this pin encounters the trip arm 117, as shown in Figure 20, it further swings such arm into contacting relation with the opposing free end of a shifting bar 119 connected to the clutch-actuating lever 55, and shifts the clutch collar 54 out of driving engagement with the gear 49 to arrest the rotation of the counter shaft 51 and its associated parts, and bring the turntable to rest at the elevation required for playing the selected record corresponding to that of the depressed push rod 80. A spring 117ª serves to normally retain the armature-carrying arm 111 out of contact with the magnet and the trip arm 117 retracted and out of the path of travel of the tappet pin 118.

The projected movement of the trip arm 117 by the trip pin 118 is sufficient to shift the clutch 54, 55 into clutching engagement with the gear 69 to in turn transmit motion to the cam shaft 68 to cause the crossed levers 59, 62 to expand and accordingly raise the record-supporting arms 56 to lift those records above the one selected for play and provide an operating space for the tone arm. Mounted on the cam shaft 68 for controlling the shifting of the clutch to a neutral position, and arrest the movement of the elevated stack at a predetermined position, is a cam 120 provided in its periphery with a comparatively deep notch 121 and a comparatively shallow notch 122. Pivoted at 123 alongside this cam in bearing contact therewith is a horizontally-swinging lever 124 which is provided with a recessed portion 125 forming a shoulder 126 for cooperative engagement with one or the other of the notches 121, 122. At its free end the lever 124 has pivotally connected thereto an oscillatable tie bar or link 127, shown in Figures 10 and 19, whose free end is reduced in width to provide a shoulder 128 adapted to abut against the opposing edge of the clutch-shifting lever 55, said tie bar having its reduced portion guided in a yoke 129 formed on the clutch lever. By swinging the tie bar in one direction its shoulder 128 is moved clear of abutting engagement with the yoke portion 129 of the clutch lever. By this construction, when the clutch 54, 55 is automatically shifted out of clutching engagement with the gear 49 and into clutching engagement with the gear 69, the tie bar 127 is accordingly shifted with it to swing the lever 124 in a direction to release its notched shoulder 126 from the cam notch 121, and accordingly permit the cam shaft 168 to revolve to elevate the record-engaging arms 56. A spring 130 applied to the lever 124 constantly urges it toward the cam-periphery and when the arms 56 have reached their maximum height, shown in Figures 1, 3, 5 and 16, the lever automatically swings into the shallow notch 122 of the cam and simultaneously actuates the tie bar 127 to shift the clutch to neutral position and thereby arrest the record-engaging arms at the predetermined elevation required for playing the selected record.

After a given selector rod 80 has been depressed to select a record of play, its spring 83 immediately returns it to initial position. However, it is necessary to restore the companion, unlatched switch-control bell crank lever 86 from its position shown in Figure 18 to its initial position, shown in Figures 8 and 10, after the turntable 22 has been elevated to its play position, and this is preferably accomplished automatically during the time that the record stack is split and being elevated clear of the selected record to be played. To this end, one of the parts revolving with the stack-elevating cam shaft 68, say the driven gear 73, is provided with a tappet pin 131 adapted to engage one arm of an L-shaped trip lever 132 pivoted at 133. The other arm of this trip lever engages an oscillatory crank 134 journaled in bearing plates 135 between which the levers 84 and 86 are disposed and has a roller 136 free to slide lengthwise thereof for contacting with one or another of the depending arms of the bell crank levers 86. A spring 137 urges the crank into abutting relation with the trip lever 132. Thus, when the tappet 131 strikes the lever 132 it causes the crank 134 to rock in a direction to swing the bell crank lever 86 upwardly and bring its free end into latching engagement with the notched end of the selector rod engaging lever 84, as shown in Figure 8, and open the companion selector-controlled switch 89.

The means for actuating the tone arm 21 to bring it into play position over the record selected for play, after the turntable 22 has been elevated and the stack of records split above the selected one as heretofore described, and for returning the tone arm to its initial starting position after the selected record has been played, is preferably constructed as follows:—

The numeral 138 indicates the upright supporting post or column about which the tone arm revolves in a definite horizontal plane, the tone arm being pivoted to swing vertically about a pivot 139 applied to an upright stem 140 journaled in a step bearing 141 of the post 138, this vertical swinging of the tone arm being necessary in bringing its reproducing needle 142 into engagement with a record for play or out of engagement therewith when swinging outwardly over the record after play. Forwardly of its pivot 139, the tone arm is provided with a depending brace or stay bar 143, which serves to hold the tone arm in its upwardly tilted position and which, in the non-playing position of the tone arm at one side of the turntable, engages at its lower end between a relatively fixed radial stop 144 and a yieldable stop 145 pivoted at 146 and including a spring 147 which acts at a predetermined time to force the tone arm inwardly into position over the sound groove of the record to be played. At its lower end the depending stay bar has an offset lug 148 provided with a projection 149 which is adapted to control the closing of a switch 150 when the tone arm reaches the end of its playing position. This switch is disposed alongside the post 138 and is in an electric circuit including a solenoid 151 and wires 152 and 153. When this switch is closed at the end of the playing of the record, the solenoid is energized and its core or plunger 154 is disposed to laterally swing the tie bar 127 in a direction to release its shoulder 128 from engagement with the yoke portion 129 of the clutch lever 55, whereupon a spring 155 connected to said lever acts to automatically shift the clutch collar 54 into driving engagement with the gear 69 to transmit motion to the cam shaft 68 which controls the raising and lowering of the record-engaging arms 56. Also mounted on this cam shaft is a cam 156 for controlling the return swinging movement of the tone arm to its outward position at a time prior to that in which the cylindrical cam 67 functions to contract the crossed levers 59, 62 to lower the record-supporting fingers 56 to restore the split portion of the stack onto the turntable. For this purpose the cam 156 has an inwardly and outwardly directed groove 157 therein with which a pin or roller 158 carried by a horizontally-swinging lever 159 pivoted at 160 is adapted to engage. The outer end of the lever 159 is connected by a link 161 with an arm 162 applied to a sleeve 163 rotatably mounted on the tone arm post 138. This sleeve is provided with a substantially semi-circular cam surface 164 projecting therefrom and with which the lower end of a pendant yoke 165, pivoted at 166 to the upper end of the post 138, is adapted to engage to swing such yoke outwardly into abutting engagement with a projection 167 on the lower end of the pendant stay bar 143 to thereby swing the tone arm upwardly about its pivot 139 to bring the needle 142 clear of the record. The stop 144 associated with the depending stay bar of the tone arm, is attached to the sleeve 163, while the yieldable stop 145 is attached to a supporting bracket 168 secured to the post 138.

From the foregoing it will be understood that when the turntable is elevated to play a selected record and the split portion of the stack is elevated, that the tone arm is in its outwardly swung and upwardly tilted position by reason of the cam 164 engaging the pendant yoke 165 which in turn abuts against the lower end of the depending stay bar 143 of the tone arm to hold the latter in the position shown in Figure 11. During the final stage of elevating the split portion of the stack of records the ingress portion 157a of the groove 157 of the tone arm controlling cam 156 encounters the pin 158 on the lever 159 and swings the latter in a direction to turn the sleeve 163 clockwise, viewing Figure 9, so that the sleeve-carried stop 144 is moved away from the stay bar 143 of the tone arm, thereby allowing the spring-pressed stop 145 to act on such bar to force the tone arm inwardly over the record to starting position for play. As shown in Figure 7, the stop 144 may be adjustably held in a set position by a screw and slot connection 144a, the stop functioning to arrest the tone arm's movement in proper playing relation to the record. Simultaneously with this movement, the cam is released from the pendant yoke 165 and the tone arm is allowed to drop by gravity to bring its needle 142 into engagement with the sound groove of the record. It will be noted in Figure 7 that during the playing of the record the lever pin 158 assumes the position shown in said figure, where it is in the innermost or crotch portion of the cam groove 157, so that when the elevated portion of the record stack is lowered after the playing of the selected record, the lever 159 will be swung in the opposite direction, by reason of the lever-pin 158 traversing the egress portion 157b of the cam groove, to first effect the upwardly swinging movement of the tone arm to bring its needle 142 clear of the played record and enable the tone arm to be then swung by the continued movement of the lever to its non-play position.

When a record is selected for play by depressing one of the selector rods 80, means are provided for shifting the roller 136 axially of the crank 134 to bring the roller to a position in register with the companion bell crank lever 86 associated with that push rod so as to be in readiness to restore that lever to its initial position when the selection is completed. To this end, a horizontally-swinging lever 170 is provided which is bifurcated at its free end, as indicated at 171, to embrace the roller and shift it in accordance with the movements of the lever. This lever is actuated during the rotation of the elevating cam-shaft 43 for raising and lowering the turntable to the height at which the selected record is to be played, and for this purpose a cam 172 is fixed on this shaft in peripheral contact with a projection 173 on a link 174 pivotally connected to the lever 170. The turntable elevating cam 41 and the roller-actuating cam 172 are so gyrated and proportioned as to effect like stages of movement to the parts controlled, respectively, all to the end that when a given record is selected and the turntable raised to the elevation for playing it, the roller 136 will be accordingly shifted to a position on the crank 134 in alinement with the bell crank 86 of the selector button 80 companion to the selected record.

The notched lever 124 which cooperates with the notches 121, 122 in the cam 120 also performs an additional function when the deep notch 121 is engaged and when the spring 130 rocks such lever in the direction to shift the clutch 54, 55 into position to lower the turntable 22. During such time, a depending lug 175 on the lever 124 contacts one end of a horizontally-swinging lever 176 pivoted intermediate its ends at 177 and having a lug 178 at its other end which contacts one arm of a vertically-swinging bell crank lever 179 fulcrumed at 180. To the other arm of this bell crank lever is pivoted the latch 101 which cooperates with the movable member 103 of the motor switch 97 to hold it open. Thus, when the lever 124 is swung inwardly into engagement with the deep notch 122 of the cam 120, the bell crank lever 179 is rocked in a direction to bring the latch 101 into engagement with the movable switch member 103 to restore it to open position. This main motor switch 97 will only be opened under the conditions just described when the record corresponding to the last selector push rod depressed has been played. When records corresponding to additional depressed push rods are to be played, then the movements just described merely perform their functions idly and do not effect the opening of the motor switch for the reason that the bail 100, associated with the bell cranks 86 of the companion selector rods, is in its lowered position under such conditions and its tappet arm 94 is therefore in a position to hold the latch 101 clear of the latching shoulder 102 on the movable push member 103, whereby the latch is not permitted to actuate such switch member and open the switch.

In addition to the main selector-rod operated motor switch 97, there is also provided a second motor switch 181 operated independently and automatically of the main one to keep the motor circuit closed at such times as the main motor switch may be opened. This is necessary because the main switch 97 is opened by the lever 124 and associated parts immediately after the record-elevating mechanism has restored the records onto the turntable and before the turntable is lowered to its initial position. Hence the purpose of this second switch 181 is to keep the motor 30 running so that the counter-shaft 51 associated with the turntable-elevating cam 41 will continue turning to lower the turntable to its initial position. Applied to the gear 53 of the elevating cam shaft 43 is a trip pin 182 which is adapted to engage a horizontally-swinging lever 183 carrying one of the contacts of the switch 181, as shown in Figures 10 and 19. A spring 184 connected to this lever constantly urges it to swing in a direction to close the switch, and the pin 182 serves to swing the lever in the opposite direction to effect the opening of the switch. During the lowering of the turntable 22, the trip pin 182 encounters the switch-controlled lever 183 and opens the switch. When the machine is started up by depressing one of the selector rods 80 the main motor switch is closed and the elevating cam shaft 43 is turned, at which time the trip pin recedes from engagement with the switch lever 183 and the spring 184 thereupon closes the switch 181. It will thus be seen that the main motor switch 97 closes whenever a selector button is depressed, and remains closed until the last record of the group of push buttons, which may have been depressed, has been played, and that at that time the auxiliary motor switch 181 is momentarily opened and closed during the cycle of record-changing operations and is only left open when the last record has been played. Furthermore, the initial movement of the motor is effected through the main switch 97 and the auxiliary switch 181 does not close until after the motor has been started by the closing of the main switch.

Should it be desired to cancel or arrest the playing of a record selected, and while it is being played, a cancelling switch 185 is provided which is included in the circuit of the solenoid 151. Upon closing this switch, which may be conveniently located at the front side of the cabinet, this solenoid is energized, in the same manner as it is energized when the tone arm 21 reaches the end of playing a record, and its plunger 154 is forced outwardly against the oscillatable bar 127 to release it from latching engagement with the clutch lever 55 and thereby effect the stage of operations to swing the tone arm outwardly and restore the split stack and turntable to their initial positions.

I claim as my invention:—

1. In an automatic phonograph, a vertically adjustable turntable adapted to support a stack of records, a tone arm supported for swinging movement in a horizontal plane, means for elevating the turntable to variable heights to bring a selected record in playing position relative to the tone arm, and record-engaging means for supporting and elevating those records of the stack above the record selected for play to provide an overhead clearance space for the travel of the tone arm during playing of the selected record.

2. In an automatic phonograph, a vertically adjustable turntable adapted to support a stack of records, a tone arm supported for swinging movement in a horizontal plane, record-engaging means for supporting and elevating those records of the stack above the record selected for play to provide an overhead clearance space for the playing movement of the tone arm, and means for selectively controlling in predetermined sequence the elevation of the turntable to a record-selecting playing position and the record-engaging means to an elevation to provide said clearance space.

3. In an automatic selective phonograph, a tone arm, a vertically adjustable turntable adapted to support a stack of records and movable to different elevations corresponding to the record selected for play, means for elevating said turntable, means engageable with those records above the one selected for play for supporting and elevating them above the plane of the selected record to provide an overhead clearance space for the movement of the tone arm, means for actuating said record-engaging means, and a plurality of selector control devices corresponding in number to the records for selectively controlling the correlated action of said turntable-elevating means and said record-engaging actuating means.

4. In an automatic selective phonograph, a tone arm, a vertically adjustable turntable adapted to support a stack of records and movable to different elevations corresponding to the record selected for play, means for elevating said turntable, means engageable with those records above the one selected for play for supporting and elevating them above the plane of the selected record to provide an overhead clearance space for the movement of the tone arm, means for actuating said record-engaging means, means for simultaneously selecting a plurality of records to be played, and means governed by said selecting means for successively controlling said turntable-elevating means and said record-engaging actuating means.

5. In an automatic selective phonograph, a tone arm, a vertically adjustable turntable adapted to support a stack of records and movable to different elevations corresponding to the record selected for play, means for elevating said turntable, means engageable with those records above the one selected for play for supporting and elevating them above the plane of the selected record to provide an overhead clearance space for the movement of the tone arm, means for actuating said record-engaging means, means governed by said record-engaging actuating means for controlling the movements of the tone arm to and from its playing position, and a plurality of selector control devices corresponding in number to the records for selectively controlling the correlated action of said turntable-elevating means and said record-engaging actuating means.

6. In an automatic selective phonograph, a tone arm, a vertically adjustable turntable adapted to support a stack of records and movable to different elevations corresponding to the record selected for play, means for elevating said turntable, means engageable with those records above the one selected for play for supporting and elevating them above the plane of the selected record to provide an overhead clearance space for the movement of the tone arm, means for actuating said record-engaging means, means for selectively controlling in predetermined sequence the elevation of the turntable and record-engaging means to a selected record-playing position and for effecting, after the playing of the record, the lowering of said record-engaging means and said turntable from their selective play positions.

7. In an automatic selective phonograph, a tone arm, a vertically adjustable turntable adapted to support a stack of records and movable to different elevations corresponding to the record selected for play, means for elevating said turntable, means engageable with those records above the one selected for play for supporting and elevating them above the plane of the selected record to provide an overhead clearance space for the movement of the tone arm, means for actuating said record-engaging means, means for selecting a record or records to be played and controlling the movements of the turntable and the record-engaging means in predetermined sequence to record-playing position, means for presenting the tone arm to playing position and for returning it to initial position after the playing of the record, and means governed by the tone arm at the end of its playing position for controlling in predetermined sequence the actuation of said record-engaging means and said turntable-elevating means to restore the parts to non-playing position.

8. In an automatic selective phonograph, a tone arm, a vertically adjustable turntable adapted to support a stack of records, means for axially displacing those records of the stack above a selected one for play to provide an operating clearance for the movement of the tone arm, and actuating means for successively controlling the movement of the turntable from an initial non-playing position to variable selective playing elevations and the movement of the displacing means to a predetermined elevation relative to the turntable.

9. In an automatic selective phonograph, a tone arm, a vertically adjustable turntable adapted to support a stack of records and movable to different selective elevations to present the records selected to the plane of movement of the tone arm, means releasably engageable with the records and movable vertically relatively to the turntable to split the record-stack and support it axially above the record selected to provide an operating clearance for the tone arm, and means for actuating the foregoing means.

10. In an automatic selective phonograph, a tone arm, a vertically adjustable turntable for supporting a stack of records, means for moving the turntable to different elevations in accordance with the positions of the records in the stack to present a selected record for engagement with the tone arm, means for splitting the stack at the record selected and for elevating those records above it to provide an operating clearance for the tone arm, means for selecting a record or records to be played, and means governed by said selecting means for controlling the actuation of the turntable moving means and the stack-splitting and elevating means.

11. In an automatic selective phonograph, a tone arm, a vertically adjustable turntable for supporting a stack of records, means for moving the turntable from an initial position to different elevations in accordance with the positions of the records in the stack to present a selected record for engagement with the tone arm and for returning the turntable to its initial position after the playing of the selected record, means for splitting the stack at the record selected and for elevating those records above it to provide an operating clearance for the tone arm and for returning the split portion of the stack onto the turntable after the playing of the selected record, means for selecting a record or records to be played, means governed by said selecting means for controlling the actuation of the turntable moving means and the stack-splitting and elevating means to their respective record-play position, and means initiated by the actuation of the tone arm after the playing of the selected record for controlling the actuation of said turntable moving means and said stack-splitting means to their initial positions.

12. In an automatic selective phonograph, a tone arm, a vertically adjustable turntable for supporting a stack of records and movable to different selective elevations to present the records selected to the plane of movement of the tone arm, means releasably engageable with the records and movable vertically relatively to the turntable to split the record-stack above the record selected to provide an operating clearance for the playing movement of the tone arm, an electric motor including clutch-controlled means for governing the selective movements of said turntable and said record-engaging means, and means for selecting a record or records to be played and for controlling said motor and said clutch-controlled means.

13. In an automatic selective phonograph, a tone arm, a vertically adjustable turntable for supporting a stack of records and movable to different selective elevations to present the records selected to the plane of movement of the tone arm, means releasably engageable with the records and movable vertically relatively to the turntable to split the record-stack above the record selected to provide an operating clearance for the playing movement of the tone arm, clutch-controlled drive means for moving the turntable and record-engaging means to record play positions, and means for selecting a record or records to be played and automatically controlling the clutch-controlled means to successively arrest the turntable at an elevation to play the selected record and cause the movement of the record-engaging means to split the record-stack.

14. In an automatic selective phonograph, a tone arm, a vertically adjustable turntable for supporting a stack of records and movable to different selective elevations to present the records selected to the plane of movement of the tone arm, means releasably engageable with the records and movable vertically relatively to the turntable to split the record-stack above the record selected to provide an operating clearance for the playing movement of the tone arm, a drive means including a clutch and counter-shafts controlled thereby and operatively connected to said turntable and said record-engaging means, respectively, for moving said parts to and from their selective play positions, means for selecting a record or records to be played, means governed thereby for releasing the clutch from the turntable operating shaft to arrest the turntable at the elevation corresponding to that for playing the record selected and for engaging the clutch with the record-engaging operating shaft to split and elevate the stack, and means for shifting the clutch to neutral position upon the splitting of the stack.

15. In an automatic selective phonograph, a tone arm, a vertically adjustable turntable for supporting a stack of records and movable to different selective elevations to present the records selected to the plane of movement of the tone arm, means releasably engageable with the records and movable vertically relatively to the turntable to split the record-stack above the record selected to provide an operating clearance for the playing movement of the tone arm, a drive means including a clutch and counter-shafts controlled thereby and operatively connected to said turntable and said record-engaging means, respectively, for moving said parts to and from the selective play positions, means for selecting a record or records to be played, means governed thereby for releasing the clutch from the turntable operating shaft to arrest the turntable at the elevation corresponding to that for playing the record selected and for engaging the clutch with the record-engaging operating shaft to split and elevate the stack, means for shifting the clutch to neutral position upon the splitting of the stack, and means initiated by the actuation of the tone arm after the playing of the selected record to control the clutch to successively lower the split stack and the turntable, respectively.

16. In an automatic selective phonograph, a tone arm, a vertically adjustable turntable for supporting a stack of records and movable to different selective elevations to present the records selected to the plane of movement of the tone arm, means releasably engageable with the records and movable vertically relatively to the turntable to split the record-stack above the record selected to provide an operating clearance for the playing movement of the tone arm, a drive means including a clutch and counter-shafts controlled thereby and operatively connected to said turntable and said record-engaging means, respectively, for moving said parts to and from their selective play positions, means for selecting a record or records to be played, means governed thereby for releasing the clutch from the turntable operating shaft to arrest the turntable at the elevation corresponding to that for playing the record selected and for engaging the clutch with the record-engaging operating shaft to split and elevate the stack, means for shifting the clutch to neutral position upon the splitting of the stack, means governed by the tone arm upon the completion of playing the selected records for shifting the clutch into operating position to lower the split stack and means governed by said record-engaging means for shifting the clutch from such position to a position to lower the turntable after the split portion of the stack has been restored onto the turntable.

17. In an automatic selective phonograph, a tone arm, a vertically adjustable turntable for supporting a stack of records, means for moving the turntable to different elevations in accordance with the positions of the records in the stack to present a selected record for engagement with the tone arm, means for splitting the stack at the record selected and for elevating those records above it to provide an operating clearance for the tone arm, means for selecting a record or records to be played, an electric motor including clutch-controlled means for governing the selective movements of said turntable and said record-engaging means, a switch for said motor controlled by said selecting means, and means governed by said selecting means for actuating said clutch-controlled means to selectively position the pre-selected record for play.

18. In an automatic selective phonograph, a tone arm, a vertically adjustable turntable for supporting a stack of records, means for moving the turntable to different elevations in accordance with the positions of the records in the stack to present a selected record for engagement with the tone arm, means for splitting the stack at the record selected and for elevating those records above it to provide an operating clearance for the tone arm, means for selecting a record or records to be played, an electric motor including clutch-controlled means for governing the selective movements of said turntable and said record-engaging means, a main switch for said motor, means initiated by said selecting means when moved to a record-selecting position to close said switch, an auxiliary switch for said motor, means controlled by said turntable moving means for opening and closing said auxiliary switch at predetermined times, and means controlled by the actuation of said stack-splitting means for restoring said main switch to its open position.

19. In an automatic selective phonograph, a tone arm, a vertically adjustable turntable for supporting a stack of records, means for moving the turntable from an initial position to different elevations in accordance with the positions of the records in the stack to present a selected record for engagement with the tone arm and for returning the turntable to its initial position after the playing of the selected record, means for splitting the stack at the record selected and for elevating those records above it to provide an operating clearance for the tone arm and for returning the split portion of the stack onto the turntable after the playing of the selected record, an electric motor including clutch-controlled means for governing the selective movements of said turntable and said stack-splitting means, a plurality of record-selector elements corresponding in number to the records, a switch for said motor, means for closing said switch when any one of said selector elements is moved to a record-selecting position, electrically-controlled means initiated by the actuation of a selector element for governing said clutch-controlled means to control the selective movements of the turntable and the stack splitting means to their record play positions in accordance with the record selected, and means initiated by the actuation of the tone arm after the playing of the selected record for governing said clutch-controlled means to restore the stack-splitting means and the turntable to their initial positions.

20. In an automatic phonograph, a turntable, a tone arm, motor-driven means for selectively presenting the records in playing position with the tone arm, and electrically-controlled means for said motor-driven means comprising a plurality of selector rods corresponding in number to the records, an electric circuit including a corresponding number of switches, means companion to said selector rods and actuated thereby for closing the respective switches when the rods are selected to govern said motor-driven means and play the records selected, and means common to said selector rod companion means and selectively registrable at a predetermined time with a given previously actuated companion means to move it in a direction to open its respective switch.

OTTO A. HOKANSON.